United States Patent [19]

Yagi et al.

[11] Patent Number: 4,914,671
[45] Date of Patent: Apr. 3, 1990

[54] LASER DEVICE

[75] Inventors: Shigenori Yagi; Koji Yasui; Shuji Ogawa; Masaki Kuzumoto, all of Hyogo, Japan

[73] Assignee: Mitsubishi Denki Kabushiki Kaisha, Tokyo, Japan

[21] Appl. No.: 602,584

[22] Filed: Apr. 20, 1984

[30] Foreign Application Priority Data

Apr. 20, 1983 [JP] Japan .............................. 58-69532
Nov. 28, 1983 [JP] Japan ............................ 58-223443
Dec. 5, 1983 [JP] Japan ............................ 58-229663
Jan. 12, 1984 [JP] Japan ................................ 59-3837

[51] Int. Cl.$^4$ .............................................. H01S 3/08
[52] U.S. Cl. ...................................... 372/103; 372/107
[58] Field of Search .............................. 372/103, 107

[56] References Cited

U.S. PATENT DOCUMENTS

| | | | |
|---|---|---|---|
| 3,579,140 | 5/1971 | Anderson | 331/94.5 |
| 3,603,688 | 9/1971 | Smith-Vaniz | 372/107 |
| 3,699,474 | 10/1972 | Landry | 372/103 |
| 3,904,983 | 9/1975 | Moreno | 331/94.5 C |
| 4,010,363 | 3/1977 | Hernquist | 372/107 |
| 4,330,705 | 5/1982 | Kollodge | 250/203 R |
| 4,391,519 | 7/1983 | Kuwabara et al. | 356/153 |
| 4,393,303 | 7/1983 | Spinhirne | 250/201 |

FOREIGN PATENT DOCUMENTS

0064476 7/1982 France .
141772 2/1979 Japan .

OTHER PUBLICATIONS

French Search Report.

Primary Examiner—William L. Sikes
Assistant Examiner—Robert E. Wise
Attorney, Agent, or Firm—Sughrue, Mion, Zinn, Macpeak & Seas

[57] ABSTRACT

A laser device having an infrared laser medium and an aperture member disposed within a resonator in which the mode symmetry is improved. An optical resonator including a total reflecting mirror and a partial reflecting mirror disposed at opposite ends of a gap between electrodes is arranged parallel to an optical axis and orthogonal to a gas flow direction. An aperture member disposed along the optical axis between the mirrors on the side of the partial reflecting mirror has the form of a ring having an axis coinciding with the optical axis. Plural laser beam detecting elements are disposed on the inner peripheral area of the ring. The angular positions of the mirrors are controlled such that a difference in outputs of the detecting elements is minimized.

33 Claims, 12 Drawing Sheets

DEVIATION FROM CENTER (mm)

FIG. 15
FIG. 16
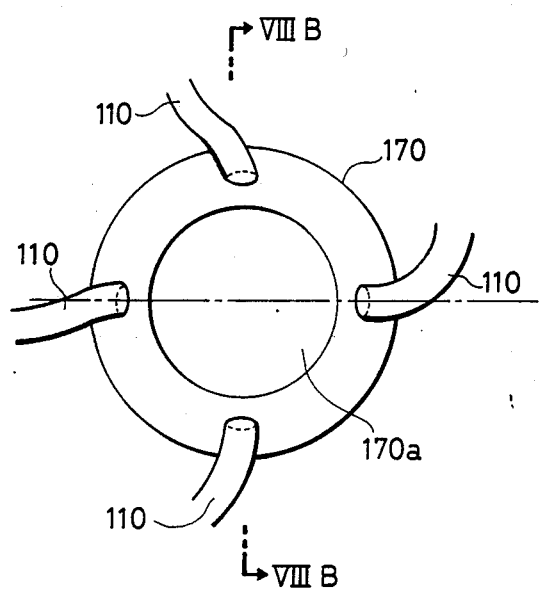
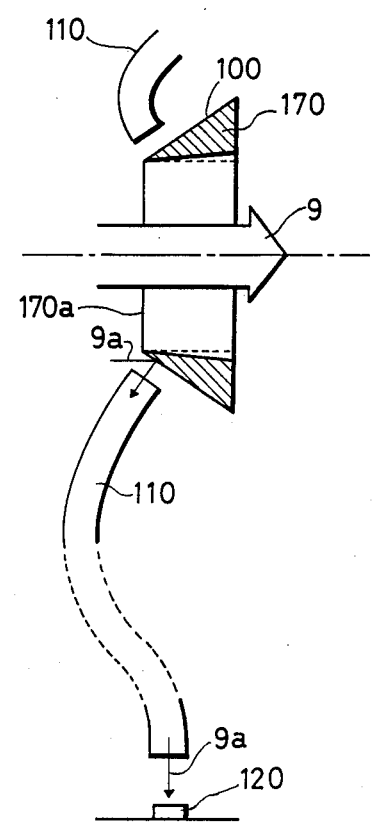

FIG. 17
FIG. 18
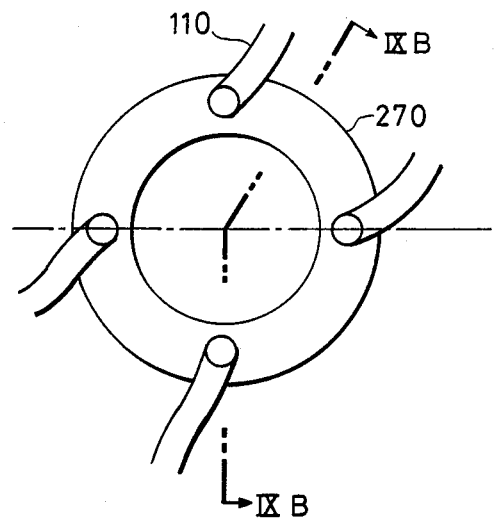
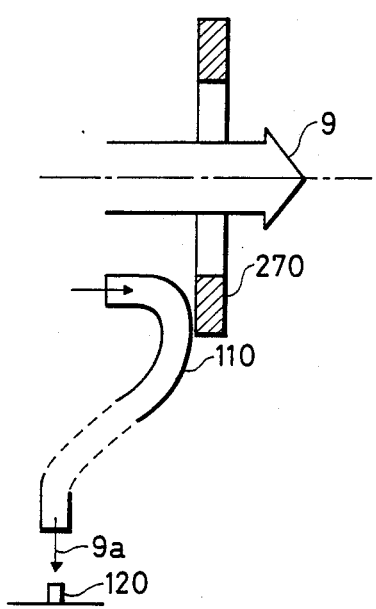

FIG. 19
FIG. 20
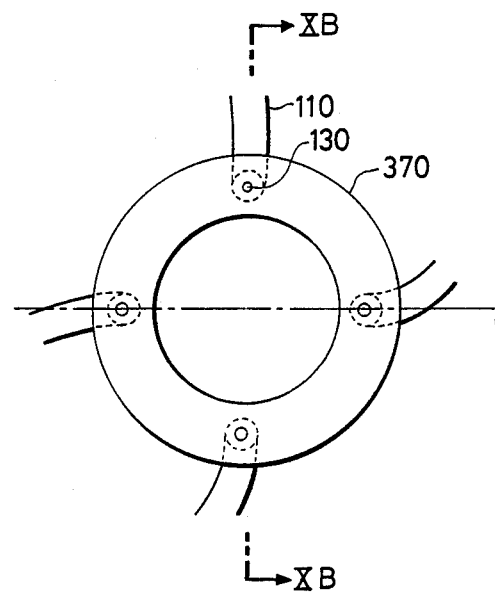
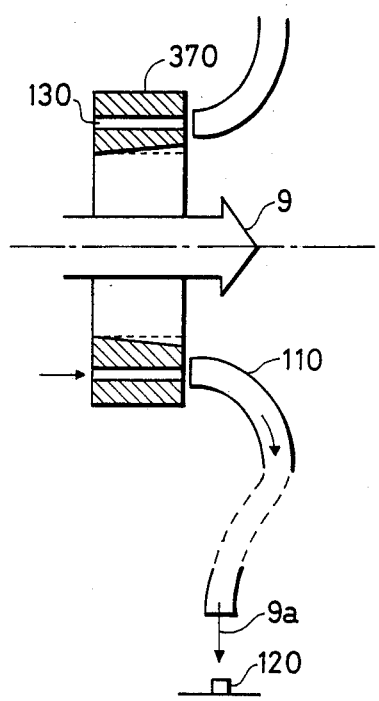

FIG. 21
FIG. 22
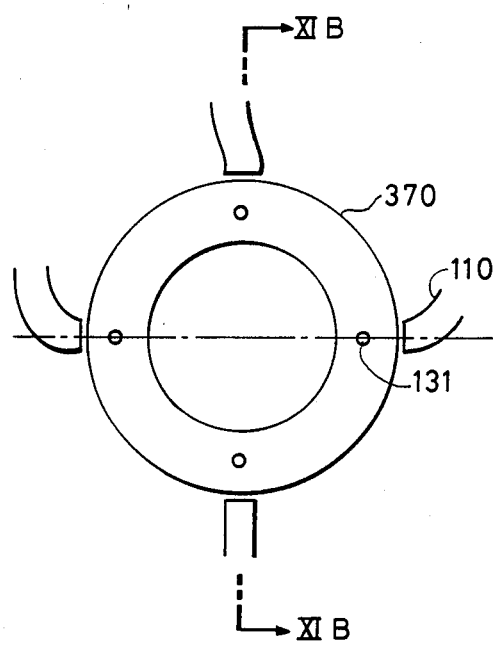
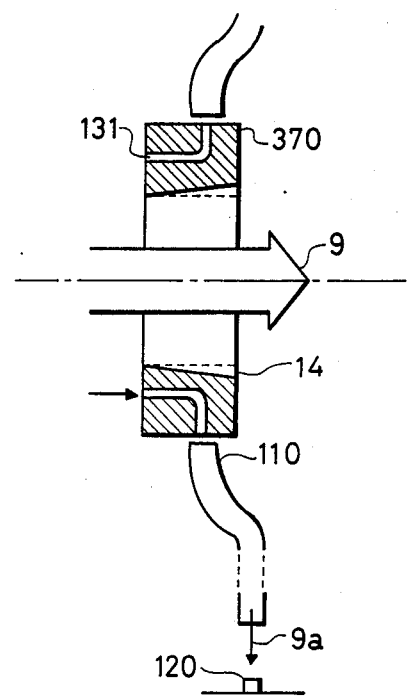

FIG. 23
FIG. 24
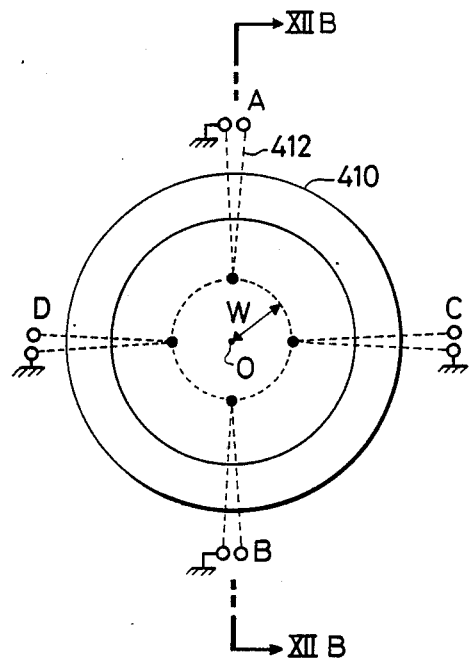
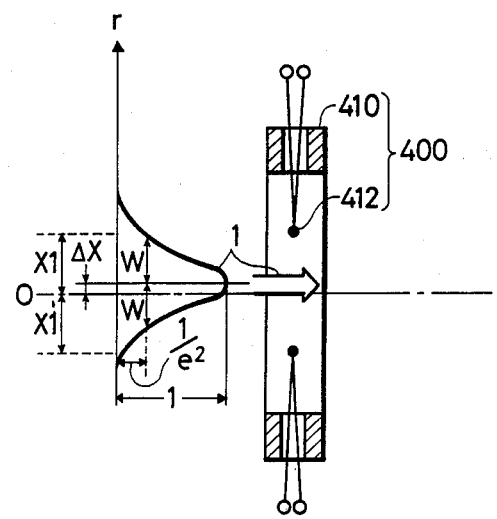

LASER DEVICE

BACKGROUND OF THE INVENTION

This invention relates to a laser device having an infrared laser medium and an aperture member disposed within the resonator.

FIG. 1 shows schematically, in cross section, a typical example of a conventional laser device of this type. In FIG. 1, an a.c. high voltage source 1 is connected between a pair of facing electrodes 2 and 3. A silent discharge 4 can be established in a space between the electrodes 2 and 3. A partial reflecting mirror 5 is disposed at one end of the space and a total reflecting mirror 6 is disposed at the other end of the space. An aperture member 7 is disposed between the partial reflecting mirror 5 and the other end of the space to suppress all laser modes other than a principal beam. The provision of each aperture member is disclosed in U.S. Pat. No. 3,904,983. In the space formed between the electrodes 2 and 3, a laser gas medium flows orthogonally of a plane of the sheet as shown by reference numeral 8. A thick arrow 9 indicates an output laser beam.

In operation, a high a.c. voltage is applied by the power source 1 across the space between the electrodes 2 and 3 to establish a silent discharge 4. At the same time, the laser gas medium flows as mentioned. The laser gas medium is excited by the silent discharge 4 to produce a laser light. A portion of the laser light directed to the mirror 6 is reflected back to the aperture member 7 and collimated thereby. A portion of the laser light directed to the half-silvered mirror 5 is partially reflected. Thus the laser beam 9 having a cross-sectional shape corresponding to an aperture 7a of the aperture member 7 is obtained. In this case, the relative position of the partial reflecting mirror 5 to the mirror 6 must be well aligned, otherwise, the mode symmetry of the laser beam 9 is broken.

Furthermore, the mode symmetry of the laser beam should be detected. However, there have been no such detection means provided in the conventional laser apparatus and thus it has been very difficult to obtain a laser beam whose mode symmetry is excellent.

U.S. Pat. No. 4,391,519 discloses an axis monitoring system for laser beams in which an externally produced ring-shaped light is introduced into a laser oscillator and reflected back. Mirrors of the laser are adjusted such that an axis of the reflected ring-shaped light and an axis of a laser output beam coincide with each other.

U.S. Pat. No. 4,393,303 discloses a deformable mirror which is controlled by a power meter and a phase control power meter such that inputs of these power meters are maximized.

These prior art devices utilize various complicated means disposed externally of the laser resonator, making the device bulky and expensive.

Further, in these prior art arrangements, the alignment of the optical axis of the resonator with the axis of the laser beam is obtained not by optimizing the laser beam symmetry but by maximizing the input to the laser beam detectors disposed externally of the resonator.

SUMMARY OF THE INVENTION

An object of the present invention is to provide a laser apparatus which is provided with a detection means for detecting the mode symmetry of the laser beam output and which can produce a laser beam output of excellent mode symmetry.

According to the present invention, the mode symmetry detection means takes the form of an aperture member disposed within a laser apparatus on an optical axis thereof. The aperture member is provided with a plurality of temperature sensing elements disposed around an outer periphery of an aperture thereof to detect a temperature distribution of the outer periphery of the aperture of the aperture member, and the relative position of the mirrors is regulated by making uniform the temperature distribution.

According to another embodiment, the detecting means takes the form of an optical fiber having a first end disposed around the aperture member and a photodetector disposed at the other end to detect the light intensity distribution around the aperture member.

Another object of the present invention is to provide a regulation system for regulating the relative position of the mirrors in accordance with the temperature or light intensity distribution around the aperture member.

The above objects are achieved by providing a signal processing device for processing information from the detection means to minimize the nonuniformity of the temperature or light intensity distribution around the aperture member.

BRIEF DESCRIPTION OF THE DRAWINGS

FIG. 15 is a plan view of a laser beam detector of a fifth embodiment of the present invention;

FIG. 16 is a cross section taken along a line VIIIB—VIIIB in FIG. 15;

FIG. 17 shows a further embodiment of the laser beam detector;

FIG. 18 is a cross section taken along a line IXB—IXB in FIG. 17;

FIG. 19 shows another embodiment of the laser beam detector;

FIG. 20 is a cross section taken along a line XB—XB in FIG. 19;

FIG. 21 is another embodiment of the laser beam detector;
}

FIG. 22 is a cross section taken along a line XIB—XIB in FIG. 21;

FIG. 23 depicts a further embodiment of the laser detector;

FIG. 24 is a cross section taken along a line XIIB—XIIB in FIG. 23;

DESCRIPTION OF THE PREFERRED EMBODIMENTS

Figure 1:
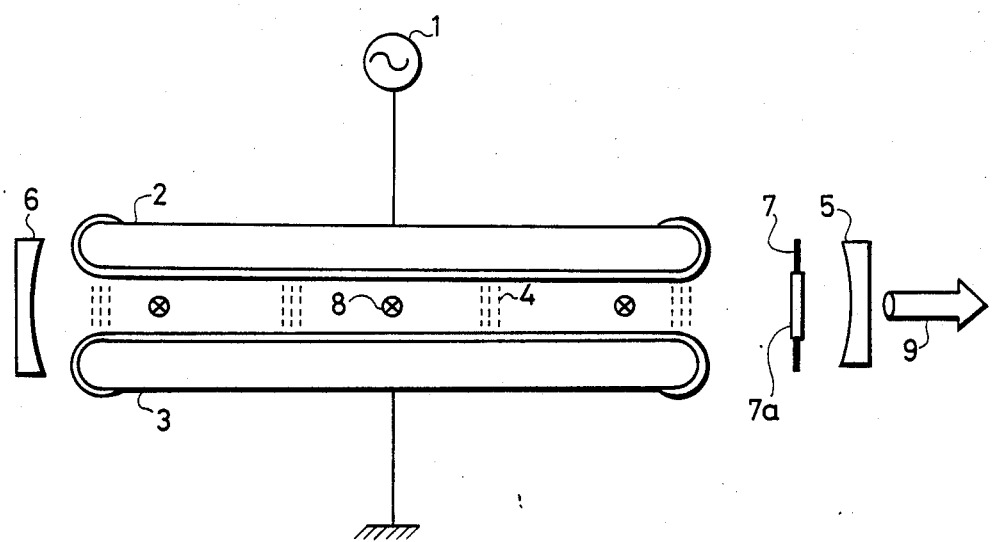
FIG. 1 illustrates a conventional laser device schematically.
Figure 2:
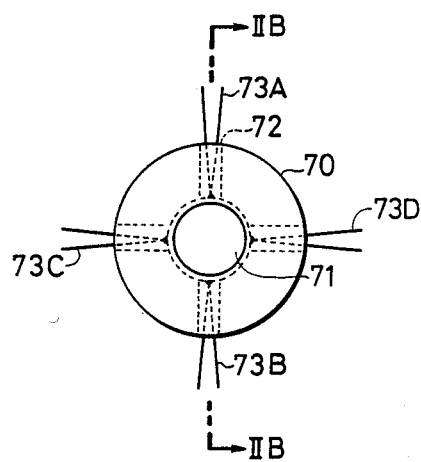
FIG. 2 is a plan view of an aperture member to be used in a first embodiment of a laser device according to the present invention.
Figure 3:
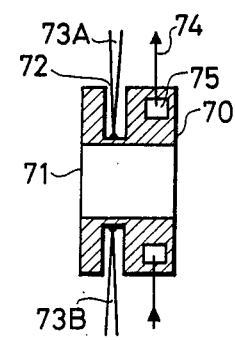
FIG. 3 is a cross section taken along a line IIB—IIB in FIG. 2.

FIG. 2 shows an embodiment of the aperture member according to the present invention and FIG. 3 is a cross section taken along a line IIB—IIB in FIG. 2. In FIGS. 2 and 3, a ring shaped aperture member 70 is formed with a center aperture 71 whose axis coincides with an optical axis of a laser resonator such as shown in FIG. 1. The aperture member 70 is formed on an outer peripheral surface thereof with a plurality of radially extending holes 72. The radial holes 72 are equiangularly arranged. In each such radial hole 72, a thermocouple 73 is provided. The aperture member 70 is further formed with an annular channel 75 through which a cooling medium such as water is caused to flow, as shown by an arrow, to cool the aperture member 70.

The aperture member 70 is disposed in the laser resonator shown in FIG. 1 in place of the conventional aperture member.

With the aperture member 70 of the present invention, the axis of the laser beam 9 deviates from a center axis of the aperture member 70 when the alignment of the total reflecting mirror 6 and the partial reflecting mirror 5 is distribed, resulting in a nonuniform temperature distribution of the aperture member 70.

A device (not shown) for adjusting the relative position of the mirrors 5 and 6 is provided. The position adjusting device may respond to outputs of the thermocouples 73 to adjust the relative position, e.g., relative angle, of the partial reflecting and total reflecting mirrors 5 and 6 such that there is no difference in outputs between the thermocouples 73. Therefore, a laser beam 9 having excellent symmetry can be obtained. The coolant 74 functions to restrict unnecessary increases of the temperature level of the aperture member 70.

The position adjusting device may include an automatic servo mechanism which monitors the outputs of the thermocouples 73 continuously upon which the relative position of the mirrors is adjusted. An example of such position adjusting means will be described later.

Figure 4:
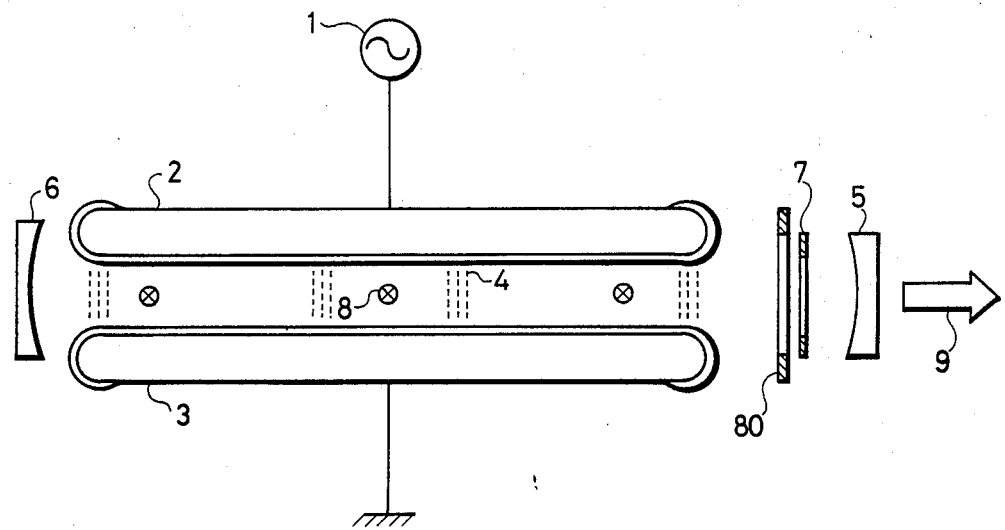
FIG. 4 illustrates a second embodiment of the present laser device.
Figure 5:
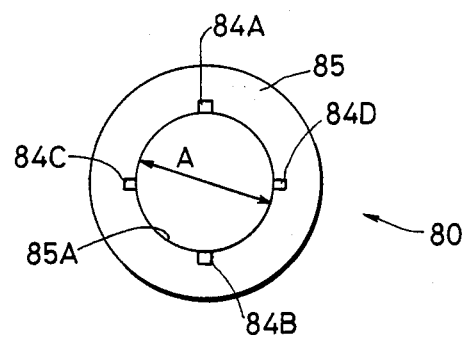
FIG. 5 is a plan view of a laser beam detector shown, in cross section, in FIG. 4.

FIG. 4 shows a further embodiment of the present invention in which the aperture member is constituted with a combination of a conventional aperture member 7 for mode selection and a laser beam detection member 80. The laser beam detection member 80 includes a ring member 85 which has a center opening 85A having a diameter A and a plurality of laser beam detecting elements 84A to 84D equiangularly arranged in a periphery of the opening 85A as shown in FIG. 5.

For a $CO_2$ gas laser operating in the $TEM_{00}$ mode at 1 KW output, the reflection of the partial reflecting mirror 5 is 40% and power components of the standing wave power in the resonator around at the position of the laser beam detection element 84 are 2.5 KW and 1 KW, respectively.

A diameter w of a circular area at the periphery of which the intensity of the standing wave becomes $1/e^2$ is about 13 mm. The diameter $\phi_a$ of the opening of the aperture member 7 for mode selection is 1.7 w, which corresponds to 22 mm, the diameter A of the opening of the aperture member 85 is 32 mm, and the active area of the laser beam detection elements 84A to 84D is 4 mm².

As is well known, the standing laser wave produced in the resonator includes a rightward component in the direction to the partial reflecting mirror 5 and a leftward component. The shape of the rightward standing wave is determined by the mode selection aperture 7 and directed to the partial reflecting mirror 5. 1 KW of its power is passed therethrough outwardly and the remaining 1.5 KW is reflected back to the mirror 6 and then to the mode selection aperture 7. In this process, the rightward standing wave is amplified optically to 2.5 KW while diverging in cross sectional area, the periphery of which is cut away by the aperture 7.

Figure 9:
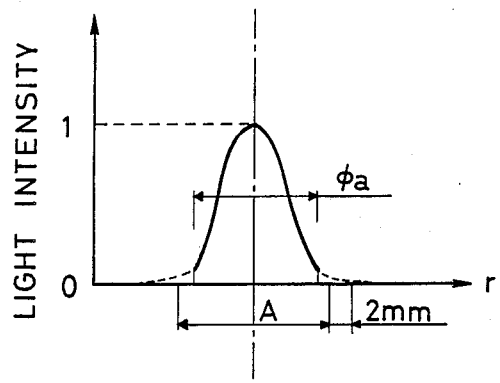
FIG. 9 is a graph showing an intensity distribution of a laser beam in a resonator.

The power of the laser beam portion which is cut away by the aperture 7 may be about 1% of the rightward power, i.e., several mW to several 10 mW, and the distribution thereof is substantially normal as shown in FIG. 9. Therefore, the laser beam detection elements 84A to 84D disposed in front of the aperture 7 receive a portion of the rightward standing wave directly. The power of the portions directly received by the elements 84A to 84D may be several mW.

The laser beam detection element used in this embodiment or any of the subsequent embodiments may be any of a thermopile, a thermocouple, a pyroelectric element, a thermistor, a barometer and an infrared photodiode, etc.

Figure 10:
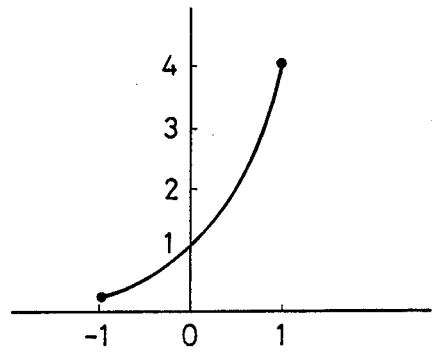
FIG. 10 is a graph for explaining a position detection performance with respect to a deviation of a laser axis from an optical axis of a resonator.

With such arrangement as above, when the axis of the laser beam is not registered with the center axis of the aperture member 80, the outputs of the laser beam detection elements 84A to 84D become unbalanced. FIG. 10 shows a power detected by the laser beam detector elements 84A to 84D when the axis of the laser beam deviates from the center of the opening 85A of the aperture member 85 by ±1 mm, with the detected power when the axis of the laser beam coincides with the center of the opening 85A being normalized to 1. In FIG. 10, a radially outward deviation of the laser beam from the detection element is shown by a minus deviation.

The detection performance of the laser beam detection element is expressed by the following equation:

$$\alpha = \frac{\text{deviation of center}}{\text{variation of incident intensity}} = \frac{1 \text{ mm}}{400\%} = 0.003 \text{ mm}/\%.$$

From the above detection performance, it is possible to detect the position of laser beam with an accuracy of the order of 0.03 mm by employing a laser beam detector element capable of detecting a power change of, for example, 10%.

Figure 6:
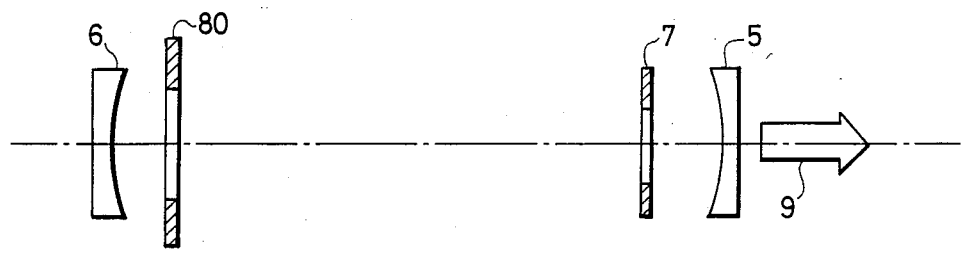
FIGS. 6 to 8 show modifications of the embodiment shown in FIG. 4, respectively.
Figure 7:
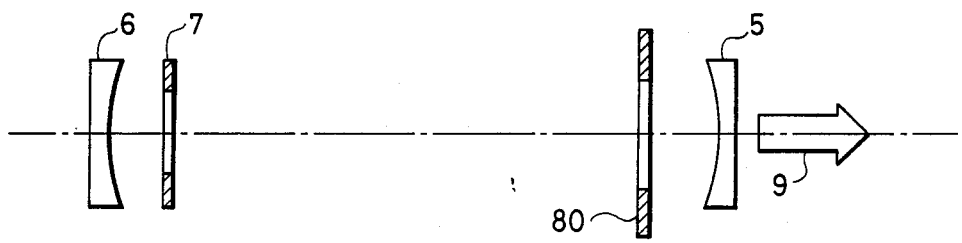
Figure 8:
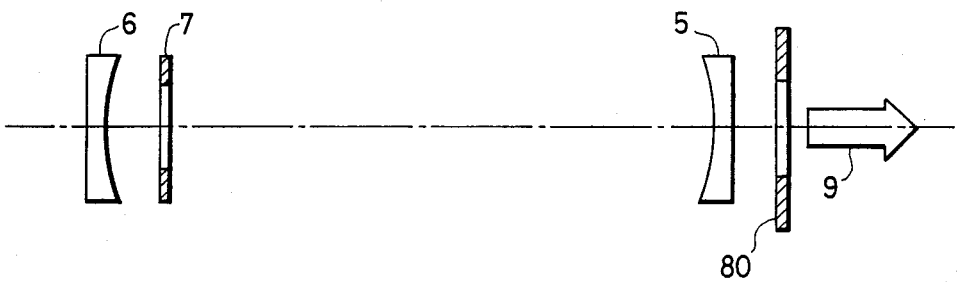

FIGS. 6 to 8 show modifications of the embodiment shown in FIG. 4, respectively. In FIG. 6, the beam position detector 80 is disposed in the side of the total reflecting mirror 6 while the aperture member 7 is positioned in the partial reflecting mirror 5. In the modification in FIG. 7, the positions of the beam position detector and the aperture member 7 in the modification in FIG. 6 are reversed.

In the modifications shown in FIG. 8, the beam position detector 80 is disposed outside the resonator region defined in between the partial reflecting mirror 5 and the total reflecting mirror 6.

In any of the modifications shown in FIGS. 6 to 8, the laser beam passed through the aperture 7 diverges and the laser power of the peripheral portion thereof is directly detected by the beam position detector 80, with the same effect as that obtainable in the embodiment shown in FIG. 4.

Figure 11:
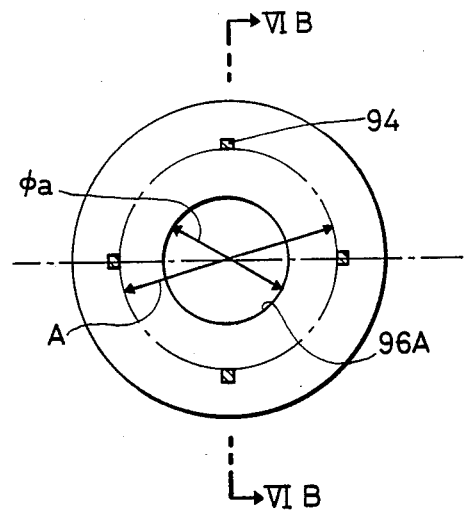
FIG. 11 is a plan view of a laser beam detector to be used in a third embodiment of the present invention.
Figure 12:
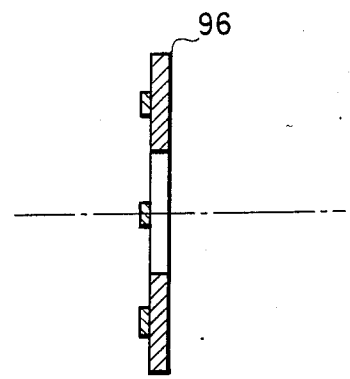
FIG. 12 is a cross section taken along a line VIA—VIA in FIG. 11.

FIG. 11 shows another embodiment of the present invention and FIG. 12 is a cross section taken along a line VIB—VIB in FIG. 11.

In FIGS. 11 and 12, the ring member 85 and the mode selection aperture 7 which constitute the laser beam position detection member 80 in FIGS. 4 and 5 are combined as a single member by forming a mode selection opening 96A having diameter $\phi_a$ in an aperture member 96 and providing laser beam detection elements 94 in the aperture member 96 along a circle having a diameter A.

Figure 13:
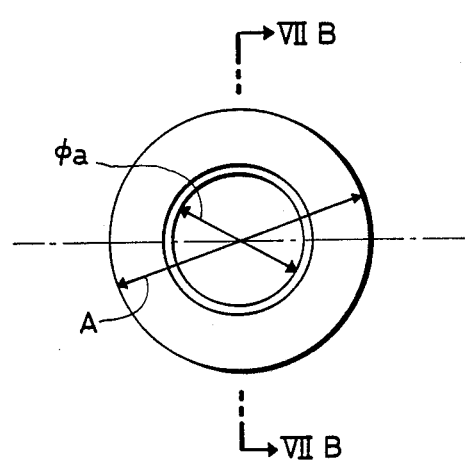
FIG. 13 is a plan view of a laser beam detector to be used in a further embodiment of the present invention.
Figure 14:
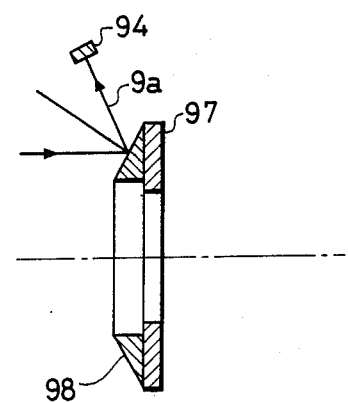
FIG. 14 is a cross section taken along a line VIIB—VIIB in FIG. 13.

FIG. 13 shows another embodiment whose cross section taken along a line VIIB—VIIB is shown in FIG. 14, in which a reflector portion 98 is formed on a front surface of an aperture member 97 and laser beam detection elements 94 are arranged such that they receive laser beam reflected from the reflector portion 98.

FIG. 15 shows another embodiment of the aperture member and FIG. 16 is a cross section taken along a line VIIIB—VIIIB in FIG. 15. In FIGS. 15 and 16, the aperture member takes the form of a frusto-conical ring 170 having a center hole 170a. A slanted surface 100 of the frusto-conical ring 170 is used as a reflection surface for reflecting laser light 9a falling thereon.

A plurality of optical fibers 110 are arranged equiangularly, with first ends thereof facing the reflection surface 100 to receive the laser light 9a reflected thereby and the other ends facing laser beam detectors 120, respectively.

Taking a 1 KW $CO_2$ laser as an example, a laser beam having an internal power of 2.5 KW under a standing condition provides a laser output of 1 KW which corresponds to 40% of the total power and the remaining 1.5 KW laser power is reflected by the half silvered mirror 5. The reflected laser beam is amplified in the discharge space and then reflected by the mirror 6 back to the partial reflecting mirror 5. At this time, due to the existence of the aperture member 170 having the opening 170a, a portion of the laser beam passing through the opening 170a, which is mainly propagating rightwardly, may suffer a diffraction loss, the amount of which may be on the order of several watts in this case, from a value estimated from a temperature increase of the aperture member 170. Therefore, a laser power of several tens of milliwatts, which is a portion of the diffraction loss, passes to the optical fibers 110 and is guided to the laser beam detector 120.

The position of the laser beam is detected at points remote enough from the center of the laser beam by the use of the aperture member 170, the optical fibers 110 and the laser detection elements 120. Therefore, the response to a deviation of the laser beam from the axis thereof is quick and the responsiveness thereof is acceptable without affecting the laser beam quality adversely.

That is, when the center axis of the laser beam is moved form the center axis of the opening 170a of the aperture member 170, there is produced a difference in output laser power between the orthogonally arranged optical fibers. Therefore, by dividing the total reflecting mirror 6 and/or the partial reflecting mirror 5 such that the difference disappears, it is easily possible to obtain a laser beam whose axial segmenting is excellent.

Further, since the laser beam detection elements 120 can be arranged at a place remote from the laser apparatus, it is possible to exclude thermal and/or electromagnetic influences on the elements.

FIG. 17 shows another embodiment of the aperture member and FIG. 18 is a cross section taken along a line IXB—IXB in FIG. 17.

In FIGS. 17 and 18, a flat type aperture member 270 is used instead of the frusto-conical member. The optical fibers 110 are arranged such that first ends thereof receive the laser beam directly.

FIG. 19 shows another embodiment and FIG. 20 is a cross section thereof taken along a line XB—XB in FIG. 19. In FIGS. 19 and 20; the optical fibers 110 receive the laser beam directly through straight laser beam guide holes 130 formed peripherally of the aperture member 370, respectively. In this embodiment, the directivity is improved and the reliability of position detection is also improved.

In another embodiment shown in FIGS. 21 and 22, the guide holes 131 are bent so that the optical fibers 110 can be arranged flat. This embodiment provides substantially the same effect as that obtained in the embodiment in FIGS. 19 and 20.

FIG. 23 shows a further embodiment and FIG. 24 is a cross section taken along a line XIIB—XIIB in FIG. 23. In FIG. 24, a power distribution similar to that shown in FIG. 9 is also shown.

In FIGS. 23 and 24, the laser beam detector 400 is composed of a holder 410 in the form of a ring having a plurality (four in this embodiment) of radial through-holes and are supported thereby. Photodetecting portions 412 thereof are arranged along a circle having a center coincident with the optical axis of the resonator, and ones thereof are paired as shown in FIG. 23.

In any of the embodiments described hereinbefore, the laser power distribution in the resonator becomes substantially normal as shown in FIG. 9.

Figure 25:
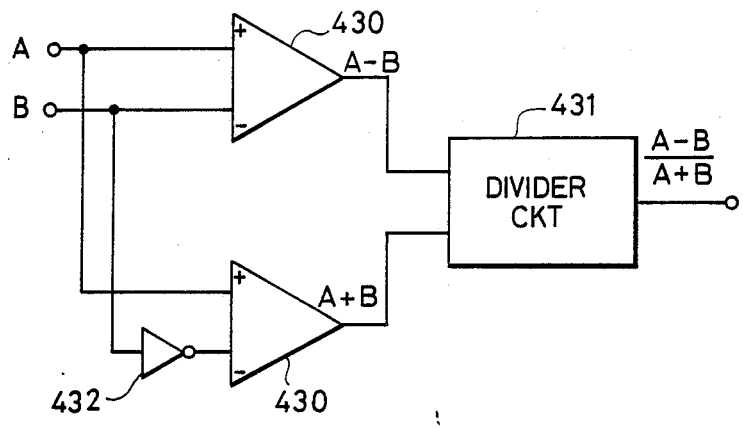
FIG. 25 shows an example of a signal processing circuit to be used in combination with the laser detector of the present invention.

FIG. 25 shows an example of a signal processing system usable for the laser beam position detector according to any of the embodiments mentioned before. The system is connected between the outputs of the paired, i.e., oppositely arranged laser beam detecting elements in FIG. 13, the outputs A and B. It includes a pair of differential amplifiers 430 having identical constructions. One of the differential amplifiers 430 has a noninverting input connected to one of the paired laser beam detecting elements A and B, and an inverting input connected to the other (B) and functions to produce a difference (A−B) at an output thereof. The other differential amplifier 430 has a non-inverting input connected to the element A and an inverting input connected through an inverting circuit 432 to the element B and functions to produce a sum of (A+B) at an output thereof. The outputs of the differential amplifier 430 are connected to inputs of a divider circuit 431 which provides (A−B)/(A+B) at an output thereof.

Taking the embodiment shown in FIGS. 23 and 24 as an example, each of the thermocouples 412 receives a peripheral portion of the laser beam directly and its thermal capacity is small. Further it is easy to arrange such thermocouples physically separately from other portions. Therefore, it is possible to obtain an output which is directly responsive to the power distribution of the laser beam with a very short response time.

For a laser beam of 0 degree Gaussian mode (TEM$_{00}$) such as shown in FIG. 24, an intensity I of the laser beam at a point radially remote from the optical axis by r can be represented as:

$$I \propto We^{-2(\frac{r}{w})^2} \quad (1)$$

where w is a radius of a dotted circle, the intensity at any point on which become $1/e^2$, the maximum intensity W of the laser beam.

When the axis of the laser beam deviates from the center O of the aperture opening by $\Delta x$, the outputs A and B can be represented by $$A = aW\left[\exp\left(-2\left(\frac{x_1 - \Delta x}{w}\right)^2\right)\right], \text{ and} \quad (2)$$

$$B = aW\left[\exp\left(-2\left(\frac{x_1 - \Delta x}{w}\right)^2\right)\right], \quad (3)$$

respectively, where a is a proportional constant.

From the equations 2 and 3, the following equation is established:

$$\frac{A - B}{A + B} = \frac{1 - e^{-\frac{8x_1\Delta x}{w^2}}}{1 + e^{-\frac{8x_1\Delta x}{w^2}}} \cdot \xrightarrow{\Delta x \to 0} 4\frac{x_1}{w^2}\Delta x \quad (4)$$

FIG. 14 is a graph showing the above equation. As will be clear from FIG. 14, the value of $$\frac{A - B}{A + B}$$

is in substantially direct proportion to the deviation $\Delta x$, regardless of the level of the full power W of the laser beam. Thus it is possible to detect the center of the laser beam with a high accuracy. Practically, for a $CO_2$ laser of about 1 KW, for example, $x_1$ and w are on the orders of 10 mm and 4.81 mm, respectively, and when the deviation $\Delta x$ is 0.1 mm, $$\frac{A}{B} = \exp\left(-8\frac{x_1\Delta x}{w^2}\right) = 0.71, \text{ and}$$

$$\frac{A - B}{A + B} = 4\frac{x_1}{w^2}\Delta x = 0.17,$$

which is large enough to detect a deviation of the axis of the laser beam from the center of the aperture member by about 0.1 mm or even smaller.

Figure 27:
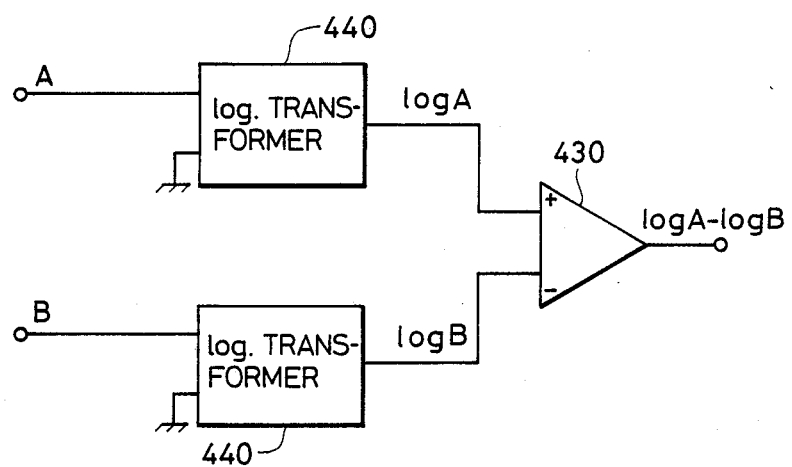
FIG. 27 is another example of the signal processing circuit.
Figure 26:
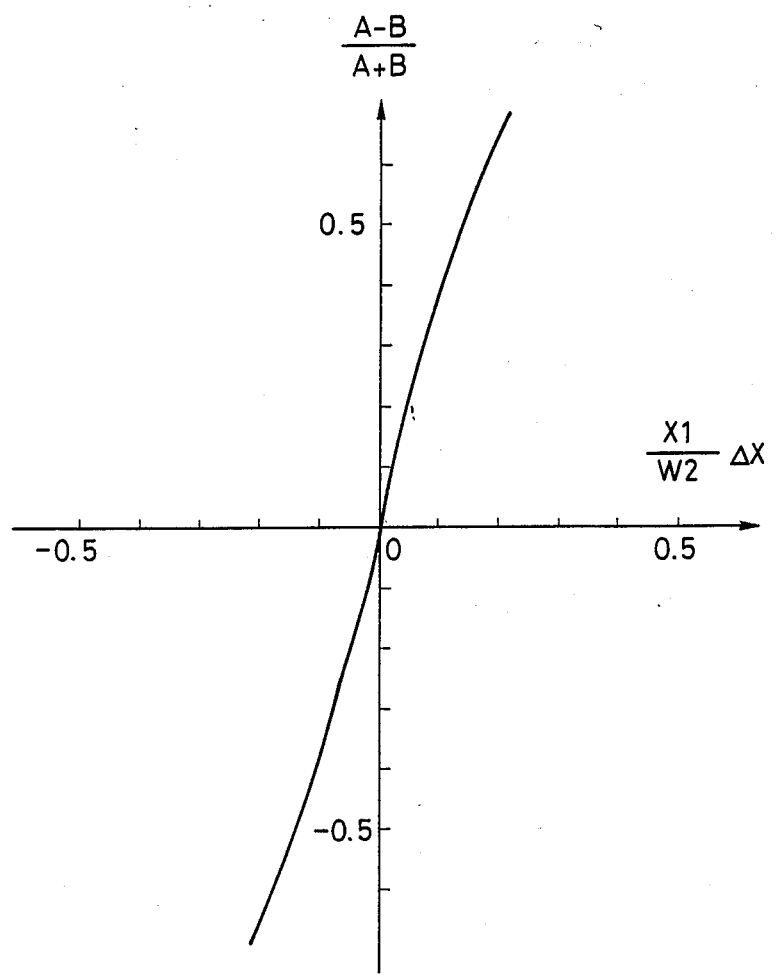
FIG. 26 is a plot of an output signal of the signal processing circuit in FIG. 25.

FIG. 27 shows another example of the signal processing system in which a pair of logarithmic transformers 440 and a differential amplifier 430 are used. In FIG. 15, the outputs A and B of the paired laser beam detecting elements are supplied to the logarithmic transformers 440 and transformed to log A and log B, respectively. The outputs log A and log B are respectively connected to a noninverting and an inverting input of the differential amplifier 430, and a difference (log A − log B) is obtained at an output thereof which can be represented, according to the equations (2) and (3), as $$\log A - \log B = 8\frac{x_1}{w^2}\Delta x. \quad (5)$$

This is direct proportion to the deviation $\Delta x$ with a larger proportional constant than that in the former example.

In any case, the outputs of the signal processing circuits each provided for different ones of the laser beam detector element pairs are used as inputs to any conventional servo mechanism to regulate the relative position or attitude of the mirror.

As described hereinbefore, according to the present invention, the symmetry of the laser beam is optimized by directly detecting the deviation of the center axis of the laser beam from the optical axis of the resonator by means of the laser beam detectors arranged inside of the resonator and by regulating the mirror system according to the detected deviation. Therefore, the alignment of the laser beam can be achieved very easily without increasing the size of the laser device.

We claim:

1. A laser device comprising: a pair of electrodes facing each other with a predetermined gap therebetween and adapted to receive a voltage thereacross produced by a voltage source; a laser medium gas flowing through said gap; an optical resonator including a total reflecting mirror and a partial reflecting mirror disposed at opposite ends of said gap; a ring-shaped aperture member disposed on an optical axis of said optical resonator between said mirrors, said aperture member having an opening extending therethrough whose axis coincides with said optical axis; and a plurality of laser beam detection elements arranged in a ring for detecting laser power of a peripheral portion of a laser beam passed through said aperture member for regulating angular positions of said mirrors with respect to said optical axis.

2. The laser device as claimed in claim 1, wherein said voltage source comprises an a.c. high voltage source.

3. The laser beam device as claimed in claim 1, wherein the flow direction of said laser medium gas is orthogonal to said optical axis of said optical resonator.

4. The laser device as claimed in claim 1, wherein said opening of said aperture member is cylindrical.

5. The laser device claimed in claim 1, wherein each of said laser beam detection elements comprises a temperature detection element.

6. The laser device claimed in claim 5, wherein each said temperature detection element comprises a thermocouple.

7. The laser device claimed in claim 6, wherein said aperture member has an annular groove formed in an outer peripheral surface thereof and said temperature detection elements are disposed in a bottom of said annular groove.

8. The laser device as claimed in claim 6, wherein said aperture member includes a ring-shaped coolant passage, an inner diameter of the ring shape of said coolant passage being greater than a diameter of said opening.

9. The laser device as claimed in claim 1, wherein said laser beam detection elements are arranged equiangularly with respect to each other along said inner periphery.

10. The laser device as claimed in claim 9, wherein a diameter of said opening of said aperture member is several times as large as a diameter of the laser beam.

11. The laser device as claimed in claim 10, wherein each of said laser beam detection elements has an effective laser beam detection area of about 4 mm$^2$.

12. The laser device as claimed in claim 9, wherein said ring-shaped aperture member has an inner periphery and an outer periphery, said laser beam detection elements being positioned between said inner and outer peripheries.

13. The laser device as claimed in claim 9, wherein said ring-shaped aperture member has a reflective surface portion between its inner and outer peripheries, said laser beam detection being arranged so as to receive laser beams reflected from said reflective surface portion.

14. The laser device as claimed in claim 13, wherein said ring-shaped aperture member has the shape of a frusto-cone, and wherein said reflective surface portion is a sloped surface of said frusto-cone.

15. The laser device as claimed in claim 1, further comprising a plurality of optical fibers arranged such that input ends thereof are disposed around said inner peripheral portion of said ring, wherein said laser beam detection elements are arranged to receive laser beam portions guided by said optical fibers.

16. The laser device as claimed in claim 15, wherein said ring-shaped aperture member has a reflective surface portion between its inner and outer peripheries, said optical fibers being arranged to receive laser beam portions reflected from said reflective surface portion.

17. The laser device as claimed in claim 16, wherein said ring-shaped aperture member has the shape of a frusto-cone, and wherein said reflective surface portion is a sloped surface of said frusto-cone.

18. The laser device as claimed in claim 15, wherein input ends of said optical fibers are arranged in front of said aperture member to receive laser beam portions directly.

19. The laser device as claimed in claim 15, wherein said ring-shaped aperture member has a plurality of passage holes and said optical fibers are arranged to receive laser beam portions passing through said passage holes.

20. The laser device as claimed in claim 19, wherein said passage holes are positioned to extend parallel to said optical axis of said optical resonator.

21. The laser device as claimed in claim 19, wherein each of said passage holes has an inlet portion which is positioned parallel to said optical axis of said optical resonator and outlet portion which is positioned in an outer peripherla surface of said ring-shaped aperture member.

22. The laser device as claimed in claim 1, wherein said laser beam detection elements are arranged in pairs, the elements in each pair being arranged diametrically opposite one another on said ring-shaped aperture member.

23. The laser device as claimed in claim 22, wherein said laser beam detection elements are positioned so as to face radially inwardly in said opening.

24. The laser device as claimed in claim 22, further comprising a signal processing system for processing output signals A and B of said laser beam detection elements in each pair to provide an output signal for driving said regulating means.

25. The laser device as claimed in claim 24, wherein said signal processing system comprises means operating in response to said output signals A and B to provide a signal corresponding to $(A-B)/(A+B)$.

26. The laser device as claimed in claim 25, wherein said signal processing system comprises a first differential amplifier for producing an output corresponding to a difference between said output signals A and B, a second differential amplifier for producing an output corresponding to a sum of said output signals A and B, and a divider circuit for dividing said output of said first differential amplifier by said output of said second differential amplifier.

27. The laser device as claimed in claim 24, wherein said signal processing system comprises means for producing a signal corresponding to $\log A - \log B$.

28. The laser device as claimed in claim 27, wherein said signal processing system comprises a first logarithmic converter for converting said output signal A to log A, a second logarithmic converter for converting said output signal B to log B, and a differential amplifier for producing a difference between outputs of said first and second logarithmic converters.

29. The laser device as claimed in claim 1, wherein each of said laser beam detection elements comprises a device selected from the group consisting of a pyroelectric element, a thermistor, a platinum resistor wire, a photodiode, a barometer, and Ag-Ge and HgCdFe elements.

30. The laser device as claimed in claim 1, wherein said laser beam detection elements are disposed between said mirrors.

31. The laser device as claimed in claim 1, wherein said laser beam detection elements are disposed outside said mirrors.

32. A laser device comprising: a pair of electrodes facing each other with a predetermined gap therebetween and adapted to receive a voltage thereacross produced by a voltage source; a laser medium gas flowing through said gap; an optical resonator including a total reflecting mirror and a partial reflecting mirror disposed at opposite ends of said gap; a ring-shaped aperture member disposed on an optical axis between said mirrors, said aperture member having an opening extending therethrough whose axis coincides with said optical axis; and a plurality of temperature detection elements arranged in a ring for detecting laser power of a peripheral portion of a laser beam passed through said aperture member for regulating angular positions of said mirrors with respect to said optical axis.

33. The laser device as claimed in claim 32, wherein each of said temperature detection elements comprises a thermocouple.

* * * * *